United States Patent
Nygard et al.

(10) Patent No.: US 12,508,642 B2
(45) Date of Patent: Dec. 30, 2025

(54) TUBULAR MEMBER FLANGE ATTACHMENT AND METHODS OF ATTACHING A FLANGE TO A TUBULAR MEMBER

(71) Applicant: BOBRICK WASHROOM EQUIPMENT, INC., North Hollywood, CA (US)

(72) Inventors: Michael Nygard, Clifton Park, NY (US); Ronald Miller, Clifton Park, NY (US); Timothy Lesson, Clifton Park, NY (US)

(73) Assignee: BOBRICK WASHROOM EQUIPMENT, INC., North Hollywood, CA (US)

( * ) Notice: Subject to any disclaimer, the term of this patent is extended or adjusted under 35 U.S.C. 154(b) by 0 days.

(21) Appl. No.: 18/743,572

(22) Filed: Jun. 14, 2024

(65) Prior Publication Data

US 2025/0381591 A1    Dec. 18, 2025

(51) Int. Cl.
*B21D 39/04* (2006.01)
*A47K 17/02* (2006.01)
(Continued)

(52) U.S. Cl.
CPC .......... *B21D 39/046* (2013.01); *A47K 17/022* (2013.01); *E04F 11/1808* (2013.01);
(Continued)

(58) Field of Classification Search
CPC .... B21D 19/08; B21D 39/044; B21D 39/046; B21D 39/063; A47K 17/022;
(Continued)

(56) References Cited

U.S. PATENT DOCUMENTS 3,119,435 A * 1/1964 Greenman ........... B21D 39/063
29/523
3,280,454 A * 10/1966 Rich ..................... B21D 39/063
29/523
(Continued)

FOREIGN PATENT DOCUMENTS

WO    WO-03066251 A1 *  8/2003 ............. B21D 19/08
WO    WO-2021026590 A1 *  2/2021 ........... A47K 17/022

*Primary Examiner* — Jermie E Cozart
(74) *Attorney, Agent, or Firm* — Womble Bond Dickinson (US) LLP (57) ABSTRACT

A tubular member and flange combination includes a tubular member having a buckled section proximate an end of the tubular member. A flange is penetrated by an end of the tubular member where an end section of the tubular member is bent over the flange such that the flange is axially retained by the buckled section and the bent end section of the tubular member. A method of forming the tubular member and flange combination includes buckling the tubular member at a location proximate an end of the tubular member forming a buckled section, placing the flange over the tubular member end section such that the tubular member end section penetrates an opening of the flange, and bending an end section of the tubular member to extend over the flange, such that the flange is axially retained by the buckled section and the bent end section of the tubular member.

23 Claims, 7 Drawing Sheets

(51) Int. Cl.
*E04F 11/18* (2006.01)
*B21D 19/08* (2006.01)
*F16L 23/024* (2006.01)
*F16L 23/028* (2006.01)
*F16L 23/12* (2006.01)

(52) U.S. Cl.
CPC ............ *B21D 19/08* (2013.01); *B21D 39/044* (2013.01); *F16L 23/024* (2013.01); *F16L 23/028* (2013.01); *F16L 23/12* (2013.01); *Y10T 29/4992* (2015.01); *Y10T 403/4966* (2015.01); *Y10T 403/4974* (2015.01)

(58) Field of Classification Search
CPC ............ E04F 11/1808; Y10T 403/4966; Y10T 403/4974; Y10T 29/4992; F16L 23/024; F16L 23/028; F16L 23/12
See application file for complete search history.

(56) References Cited

U.S. PATENT DOCUMENTS

| | | | | |
|---|---|---|---|---|
| 4,205,426 | A | * | 6/1980 | Stillman, Jr. ............ E06C 7/085 29/523 |
| 4,245,960 | A | * | 1/1981 | Matthews ............. F04D 29/263 416/214 R |
| 4,261,436 | A | * | 4/1981 | Stillman, Jr. ............ E06C 7/085 182/194 |
| 6,038,714 | A | * | 3/2000 | Guenther ............... A47K 3/003 4/576.1 |
| 2005/0198732 | A1 | * | 9/2005 | Knirk ..................... A47K 10/10 4/576.1 |

* cited by examiner

TUBULAR MEMBER FLANGE ATTACHMENT AND METHODS OF ATTACHING A FLANGE TO A TUBULAR MEMBER

BACKGROUND

Tubular members that need to be mounted on a surface typically have a flange welded to an end of the tubular member. The flange is then fastened or otherwise attached to the surface. Example tubular members that attach to a surface are grab bars that are mounted onto walls, such as bathroom walls, for people to hold on to, i.e., to "grab". The problem with welded flanges is that they can fail at the weld due to loading. Moreover, during manufacturing an extra step of welding is required. A more robust attachment of a flange to a tubular member and methods for accomplishing the same are desired.

SUMMARY

In an example embodiment a tubular member and flange combination includes a tubular member having a buckled section proximate an end of the tubular member. A first section of the tubular member that is not buckled includes an outer surface opposite an inner surface, and the buckled section includes an outer surface that extends radially beyond the outer surface of the tubular member first section. A second section of the tubular member extends from the buckled section to the end of the tubular member. The combination also includes a flange including an opening penetrated by the second section of the tubular member. The second section of the tubular member is bent radially outwards. The flange is axially retained by the buckled section and the second section of the tubular member which is bent. In another example embodiment, the flange includes a first annular portion defining the flange opening, and a second annular portion extending radially outward from the first annular portion. The first annular portion is flared defining a frustum, and the bent second section of the tubular member extends over the first annular portion of the flange. In yet another example embodiment, an end of the first annular portion of the flange defines the opening of the flange, and the end of the first annular portion engages a surface of the buckled section of the tubular member. In a further example embodiment, the flange includes a fastener opening for accommodating a fastener for connecting the combination to another structure. In yet a further example embodiment, the combination also includes a flange cover penetrated by the tubular member covering a surface of the flange facing in a direction opposite the tubular member end.

In an example embodiment, a method for connecting a flange to a tubular member, includes buckling the tubular member at a location proximate an end of the tubular member forming a buckled section such that an end section of the tubular member extends axially beyond the buckled section, placing the flange over the tubular member end section such that the tubular member end section penetrates an opening of the flange, and bending the end section to extend over the flange, wherein the flange is axially retained by the bent end section and the buckled section. In another example embodiment, the flange includes a first annular portion defining the flange opening, and a second annular portion extending radially from the first annular portion. With this example embodiment, the first annular portion is flared defining a frustum. With this example embodiment, placing the flange over the tubular member end section includes placing the flange over the tubular member end section with the defined frustum having a first diameter proximate the buckled section and a second diameter greater than the first diameter distally from the buckled section closer to the tubular member end. In yet another example embodiment, bending the end section over the flange includes bending the end section of the flange to extend radially over the flange first annular portion. In a further example embodiment, bending the end section over the flange includes bending the end section of the flange to extend radially over the flange first annular portion and parallel to the flange first annular portion. In yet a further example embodiment, an end of the flange defining the opening of the flange rests on a surface of the buckled section. In yet a further example embodiment, buckling the tubular member includes supporting an outer surface the tubular member at an axial location such that the tubular member end extends beyond the axial location, and axially pressing on the end of the tubular member to cause the buckling of the tubular member adjacent the axial location forming a buckled section. In an example embodiment, bending the end section includes inserting an anvil in the tubular member through the tubular end, where the anvil includes a tapering outer surface, and engaging an inner surface of the tubular member end section with the tapering outer surface as the anvil continues to being inserted into the tubular member, bending the tubular member end section. In another example embodiment, bending the end section further includes pushing an end of the flange first annular portion defining the flange opening against a surface of the buckled section and pushing the buckled section in direction away from the tubular member end. In yet another example embodiment, axially pressing on the end of the tubular member includes pressing on the end of the tubular member with a press. In a further example embodiment, axially pressing the end of the tubular member includes receiving the end of the tubular members into an annular opening formed on the press and receiving a projection of the press within the tubular member through the tubular member end. In yet a further example embodiment, receiving a projection of the press includes receiving the projection of the press within the tubular member and over the buckled section when said buckled section is formed. In an example embodiment, supporting the outer surface of the tubular member includes using a support member having a main opening for accommodating the tubular member and a second opening extending axially from the main opening to an end of the support defining an annular step therebetween, where the buckled section is formed over the annular step and accommodated in the second opening. In an example embodiment, bending the end section includes bending the end section to be generally parallel to the flange flared first annular portion. In another example embodiment, the method also includes placing a flange cover over the tubular member, the flange cover having an opening penetrated by the tubular member.

DESCRIPTION

Example embodiments are described herein in relation to a grab bar. However, the method of attachment and the attachment itself applies to all types of tubular members or tubes.

Figure 1:
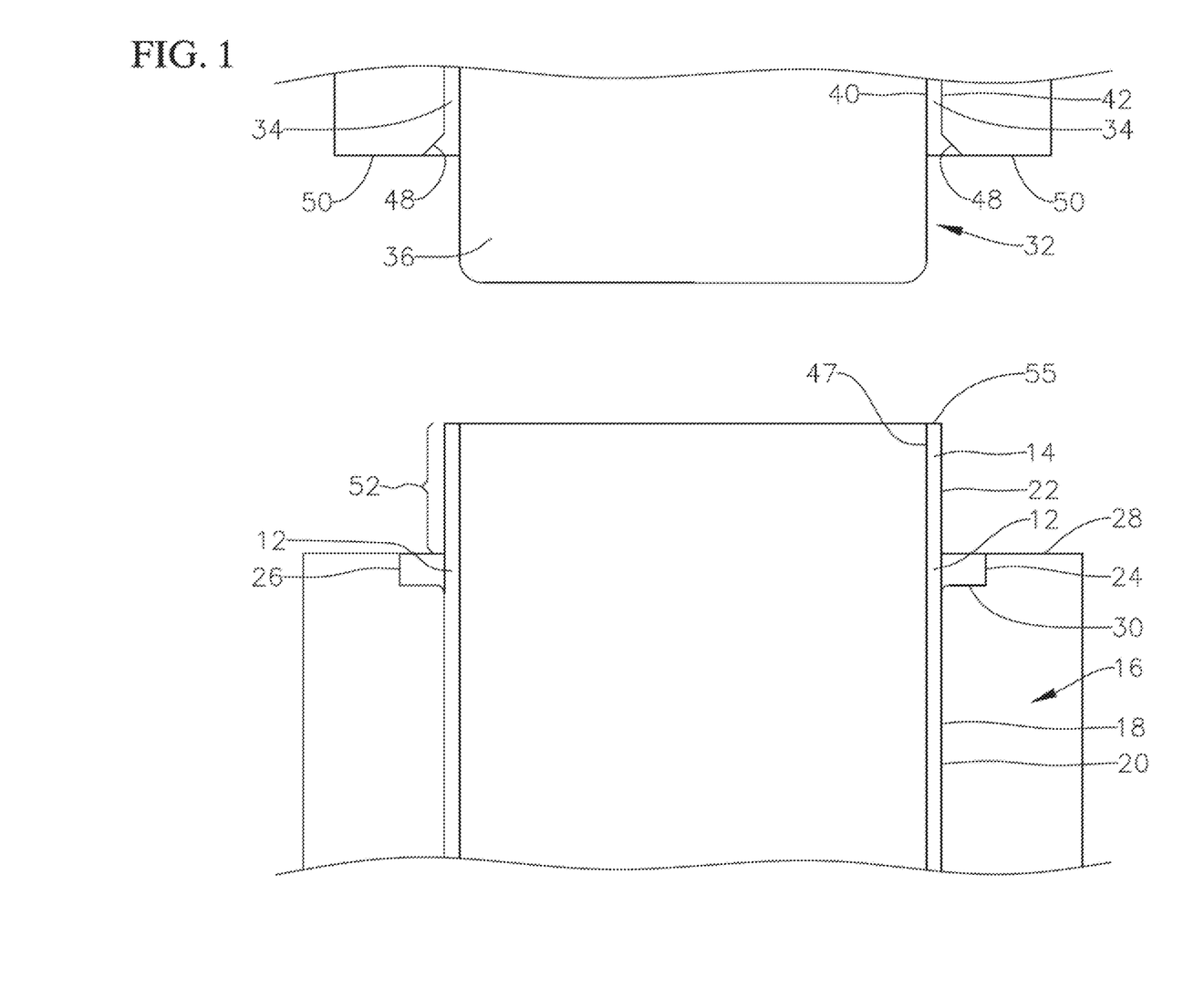
FIG. 1 is a cross-sectional view of an example embodiment assembly of a tubular member supported by an example embodiment support and a press over the support member for buckling a section of the tubular member.

To connect the flange 10 to an end section 12 of a tubular member 14, i.e., to a tubular end section 12 of a grab bar, the tubular member end portion is placed within a support 16, as shown in FIG. 1. Specifically, the support has a first or main opening 18 having an inner surface 20 that has a diameter sufficient for accommodating the outer surface 22 of the tubular member end portion 12. The inner surface diameter is slightly larger than the outer surface diameter of the tubular member end portion. In an example embodiment, the inner surface diameter of the main opening provides for a clearance fit with the tubular member end portion. In an example embodiment the clearance between the outer surface of the tubular member end portion and the inner surface of the main opening is less than 0.5 mm. In some example embodiments, it is less than 0.1 mm.

The support also includes a second opening 24 extending axially from the main opening having an inner surface 26 having a larger diameter than the diameter of the inner surface 20 of the main opening 18. The second opening extends to an end 28 of the of the support. An annular step 30 is defined in the support at the interface between the main and second openings. The support may be defined in multiple parts that come together define the main and second openings. In an example embodiment, the support comes in two radial halves which come together to define the support with the main and second opening. The support axially retains the tubular member 14.

Figure 2:
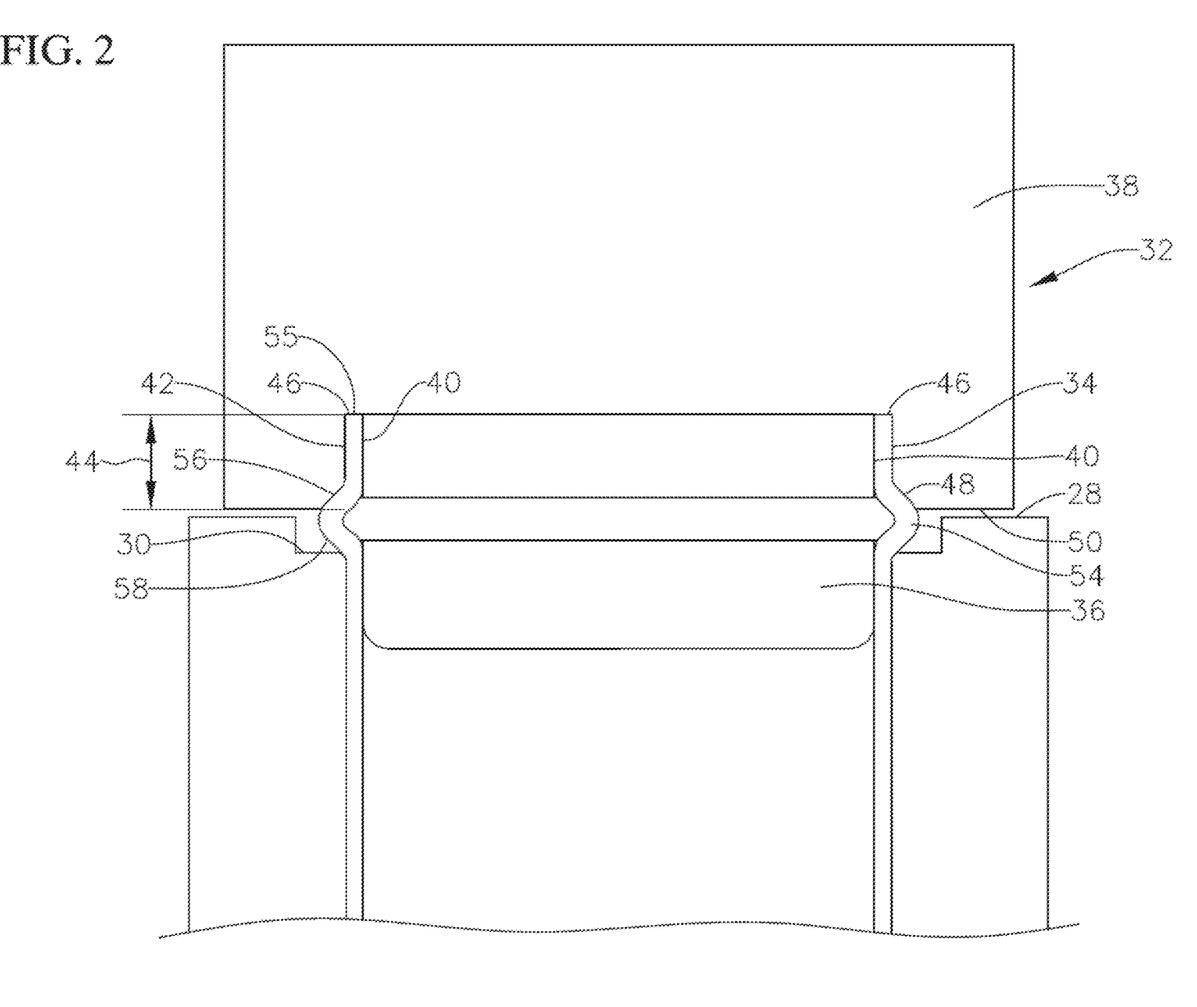
FIG. 2 is a cross-sectional view of the example embodiment assembly shown in FIG. 1 with the press pressing on the tubular member end creating a buckled section on the tubular member.

A press 32 has an axially extending annular opening 34. A projection 36 extends axially from a main body portion 38 of the press and also defines a radially inward surface 40 of the annular opening. A radially outward surface 42, defines the outward surface of the annular opening. The annular opening extends to a depth 44 from an end 50 of the press and has a base defining a base surface 46, as for example shown in FIG. 2. The projection 36 extends axially beyond the end 50 of the press. The annular opening is sized to receive the end section 12 of the tubular member 14 with minimal clearance. In an example embodiment, the annular opening provides for a clearance fit of the tubular member end portion. In an example embodiment the clearance between the outer surface of the tubular member end portion and the outward surface of the annular opening is less than 0.5 mm. In some example embodiments, it is less than 0.1 mm. Similarly, the clearance between an inner surface 47 of the tubular member end portion and the radially inward surface 40 of the annular opening is less than 0.5 mm and in a further example embodiment, less than 0.1 mm. In an example embodiment, the distal end portion of the annular opening radially outward surface 42 forms chamfer 48 extending to the end 50 of the main body portion 38 of the press. Like the support, the press may be formed by multiple members.

To form the connection between the flange 10 and the tubular member end portion 12, the tubular member end portion is placed within the main opening 18 of the support 16. In an example embodiments, where the support is made in multiple radial pieces, the pieces come together such that the inner surface of the main opening surrounds the outer surface of the end portion of the tubular member in close proximity, as for example shown in FIGS. 1 and 2, such that a distal section 52 of the tubular member end portion extends beyond the end 28 of the support.

The press is then moved axially toward the press. In another example embodiment, the support moves toward the press, or both supports move toward each other. In other words, the two supports must be moved relatively towards each other. For illustrative purposes, the example embodiments herein are described with the press moving towards the support. When that occurs, the distal section 52 of the tubular member is received within the annular opening 34 of the press and abuts the base surface 46 of the annular opening 34. When at that position, in an example embodiment, the projection 36 extends into the tubular member end portion to a location below the annular step 30 of the support, and the end 50 of the press is spaced apart from the end 28 of the support that faces the end 50 of the press. As the press continues to move toward the support, it causes a section the tubular member end portion to buckle outwards into the second opening 24 of the support, forming a buckled section 54, as the tubular member portions within the support main opening and the press annular opening are supported closely preventing such sections from buckling. The press projection which is received within, and in close proximity to, the inner surface of the tubular member end portion, prevents any inward bucking of the tubular member end portion.

The buckled section 54 extends into the second opening 24 of the support defining an outer diameter greater than the outer diameter of the unbuckled sections of the tubular member end portion. In the example embodiment, where the press annular opening outward surface includes the chamfer 48, the chamfer allows for the outer surface of the tubular member end that buckles to buckle outwards. The axial length of the section that buckles and thus, the amount that the buckled section extends radially outward is controlled by the axial spacing between the ends 28, 50 of the support and press, respectively, when the tubular member end portion end 55 abuts the base surface 46 of the press annular opening 34. If such axial spacing is longer, then a larger axial section to the tubular member will buckle and thus extend a longer distance radially outwards. In this regard, the second opening of support should have a larger diameter to accommodate the longer radial extension of the buckled section. The buckled section has two opposite surfaces 56, 58 that extend radially outward. These two surfaces extend radially outward and toward each other. The first surface 56 closer to the tubular member end 55 extends radially outward and in a direction away from the tubular member end 28, whereas the opposite or second surface 58 extends radially outward and in a direction toward the tubular member end 28.

The amount the press is moved toward the support in an example embodiment is limited by the ends 28, 50 of the first and press. In other words, the press can be moved toward the support until its end 50 contacts the end 28 of the support. In other example embodiments, the movement of the press may be stopped prior to its end contacting the end of the support. Once the bucked section is formed, the press is withdrawn from the tubular member end.

The flange 10 is then placed over the end 55 of the tubular member. In an example embodiment, the flange has an opening 60 for being penetrated by the end of the tubular member. In an example embodiment, an annular portion 62 of the flange defining the opening 60 is angled or bent, i.e., flared, defining a frustum, such that an end defining surface 64 of the flange annular portion 62 defining the opening rests on the buckled first surface 56 of the tubular member end portion closer to the tubular member end 55. In an example embodiment, the end defining surface 64 of the opening of the flange is generally parallel to the buckled first surface 56.

Figure 3:
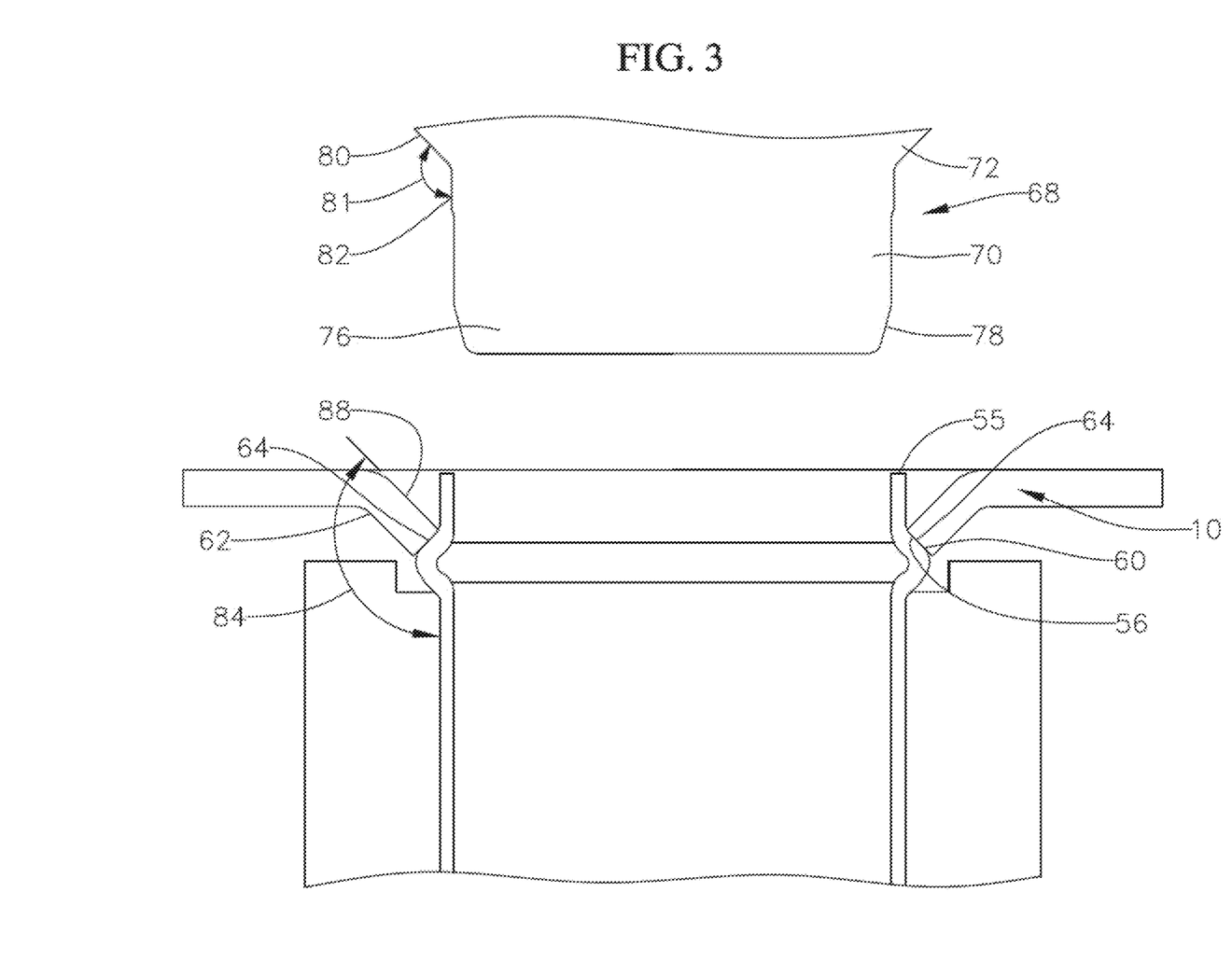
FIG. 3 is a cross-sectional view of, an example embodiment assembly including the tubular member supported by the example embodiment support shown in FIG. 1, an example embodiment flange placed over the tubular member end and having an end resting on the buckled section of the tubular member, and an anvil prior to bending an end section of the tubular member over the flange.
Figure 4:
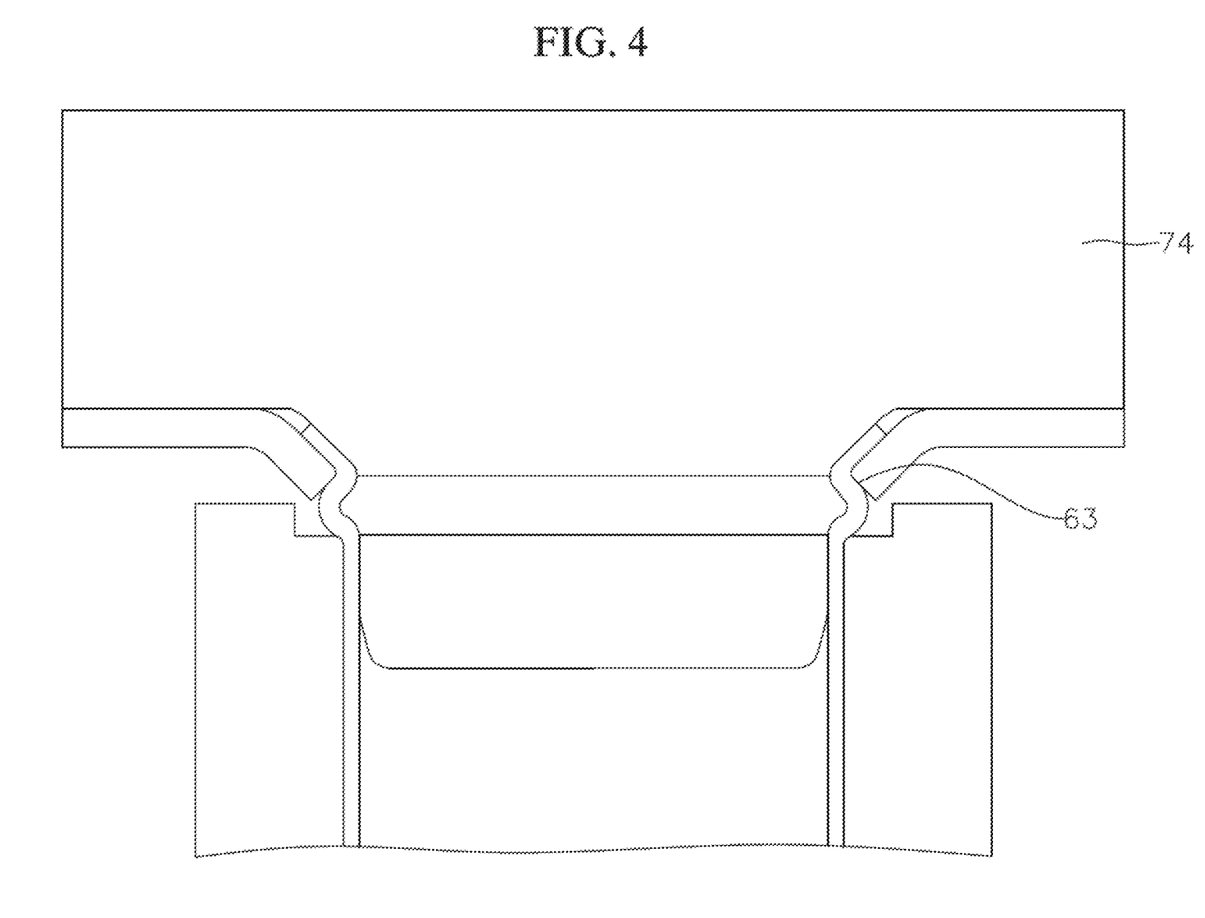
FIG. 4 is a cross-sectional view of the example embodiment assembly shown in FIG. 3 with the anvil bending and the end section of the tubular member over the flange.

An anvil 68 is then used to flare open the end of the distal end section 52 of the tubular member end portion. In an example embodiment, the anvil includes a head 70, a neck 72 and a base 74, as for example shown in FIGS. 3 and 4. The head 70 is cylindrical having an outer diameter smaller, and in an example embodiment slightly smaller than the end section of the tubular member that was not buckled. The distal end portion 76 of the head may have an outer surface 78 that is chamfered, as for example shown in FIG. 3. The neck 72 extends axially from the head and has a tapering annular outer surface 80 tapering to a larger diameter in a direction away from the head. The tapering annular outer surface defines a frustum. In an example embodiment, the annular tapering outer surface tapers at an angle 81 from the outer surface 82 of the head 70 that is the same, or generally the same, as the angle 84 of a surface 88 of the annular portion 62 of the flange 10 facing the tubular member end 55 that is bent relative to the axis of the flange opening 60. The anvil body 74 that extends from the neck in a direction opposite the head and in an example embodiment as shown if FIG. 4, extends radially beyond the neck. In an example embodiment, the radially extending axial length of tapering annular outer surface of the neck is the same, or about the same, as the radially extending length of the surface 88 of the annual portion 62 of the flange facing the tubular member end.

Figure 5:
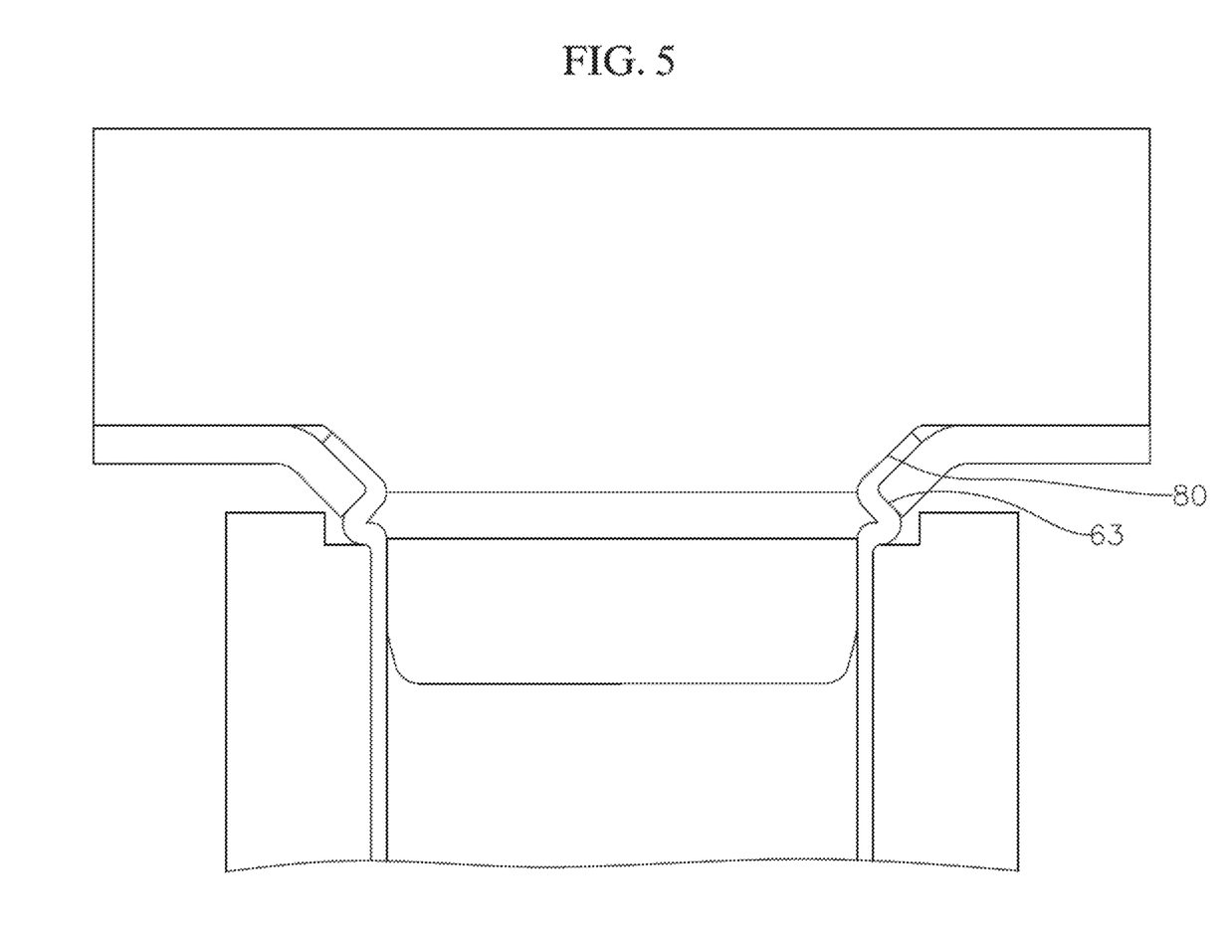
FIG. 5 is a cross-sectional view of the example embodiment assembly shown in FIG. 4 with anvil further pressing against the flange.

In an example embodiment, the anvil and/or the support are moved relatively toward each other. In the shown example embodiment, the anvil is moved toward the support. In this regard, the anvil head 70 is received within the tubular member end. As the relative movement of the anvil toward the support continues, the neck annular tapering outer surface 80 engages the inner surface of the distal section 52 of the tubular member extending from the buckled section to the tubular member end portion, causing such tubular member inner surface to bent or flare outward over the flange annular portion 62 bent surface. In the example embodiment, where the annular tapering outer surface 80 of the neck extends at an angle 81 relative to the anvil head outer surface 82 that it the same as the angle 84 of the annular surface 88 of the bent portion of the flange facing the tubular member end relative to the flange opening 60 axis, such tubular member end section is flared by the neck of the anvil so that it is parallel, or generally parallel to bent annular portion 62 of the flange. When distal section 52 of the tubular member end portion is flared, the flange 10 is axially retained by the bent or flared portion of the tubular member (e.g., the flared distal section) extending to the tubular member end and the buckled radially extending section 54 of the tubular member end portion. In other words, the bent annular portion of the flange is sandwiched between the flared portion of the tubular member and the buckled section, and more specifically the buckled first surface 56, of the tubular member. In an example embodiment, the flared surface of the tubular member engages the flared annular surface of the annular portion 62 of the flange. In an example embodiment, the anvil continues to move toward the tubular member after it flares the tubular member distal section 52 over the flared portion of the flange causing the end surface 64 defining the opening 60 of the flange to engage the first outer surface 56 of the buckled section. As the anvil continues to move toward the tubular member, the anvil body engages the flange causing pressure to be provided by the flange and its opening 60 end surface 64 against the buckled section causing the buckled section to move against the annular step 30, as for example shown in FIG. 5. The anvil is then withdrawn from the tubular member end and the tubular member is removed from the support.

Figure 6:
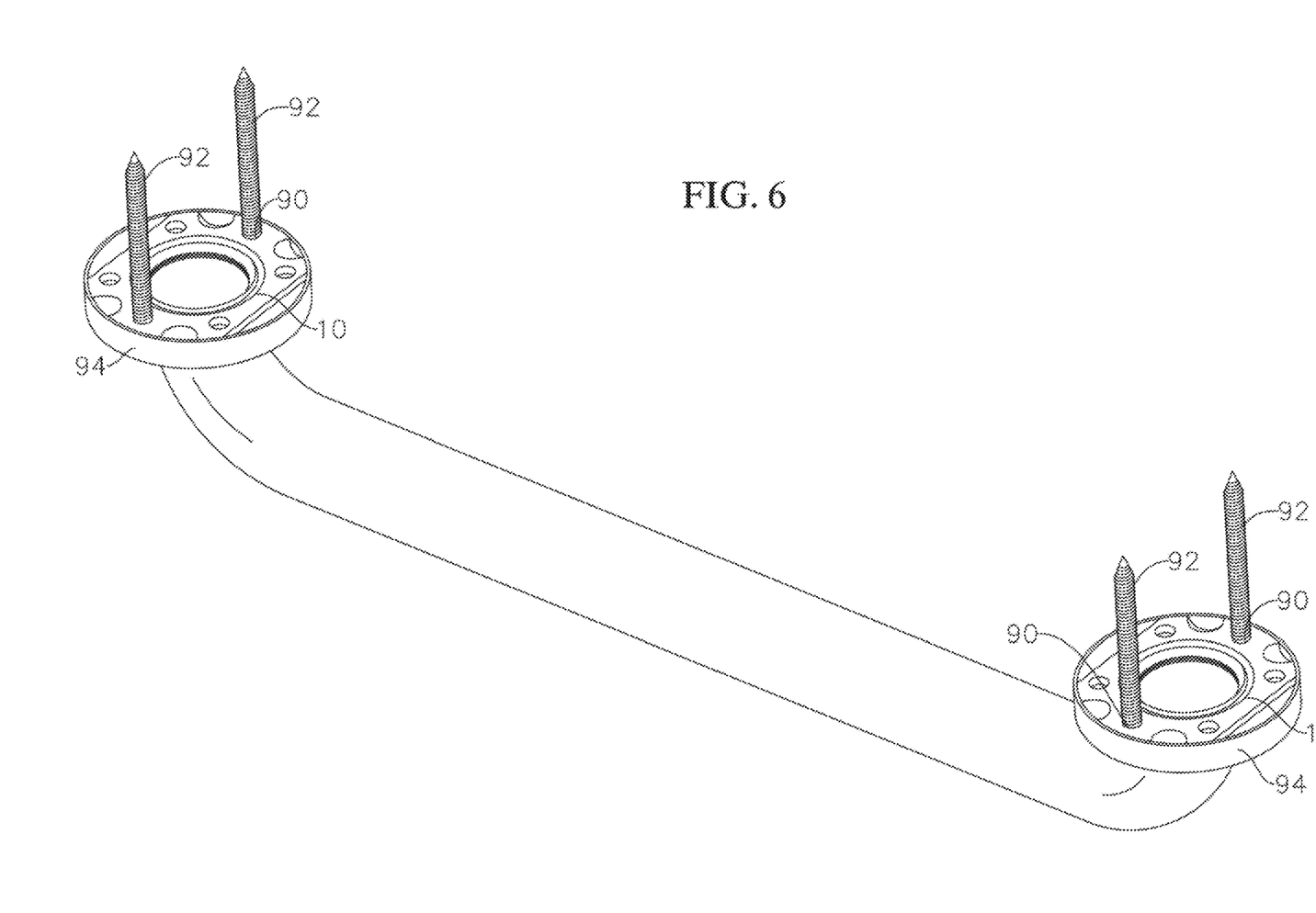
FIG. 6 is a perspective view of an example embodiment grab bar having an example embodiment coupling of flanges to its opposite ends as well as flange covers.
Figure 7:
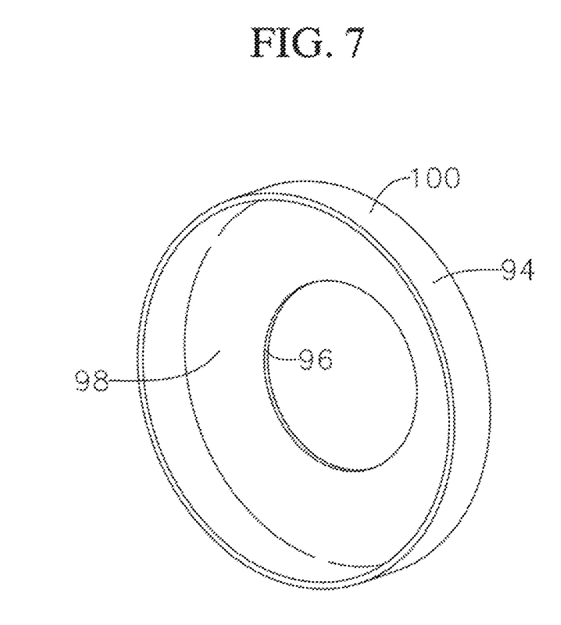
FIG. 7 is a perspective view of an example embodiment flange cover shown in FIG. 6.

In an example embodiment, the flange 10 has one or more openings 90 for accommodating fasteners 92 for fastening the flange and tubular member (e.g., for fastening the grab bar) to a structure such as a wall, as for example shown in FIG. 6. In example embodiment as shown in FIGS. 6 and 7, flange covers 94 that extend over the flange 10, so as to cover the flange, may be used. The flange cover may be installed over the tubular member prior to the bucking, or from the opposite end of the tubular member after buckling. As can be understood, if flanges are connected to both ends of the tubular member in accordance with the example embodiment herein, the flange covers must be placed over the tubular member at least prior to the bucking of the second end portion of the tubular member. In an example embodiment, each flange cover has an opening 96 having a diameter larger than the outer surface diameter of the tubular member but smaller than the outer surface diameter of the buckled section of the tubular member. A such, the flange cover can be axially retained by the its corresponding buckled section of the tubular member. If the flange cover opening has a diameter greater than the diameter of the buckled section of the tubular member, the cover will be axially retained by the flange. The flange cover should have an appropriate area to cover its corresponding flange. In the example embodiment shown in FIGS. 6 and 7, the flange cover 94 has a radially extending surface 98 from which extends an axially extending surface 100. With this example embodiment, as shown in FIG. 6, the radially extending surface 98 covers the flange 10, while the axially extending surface 100 surrounds the flange 10.

As can be seen the example methods described herein for connecting a flange to an end portion of a tubular member and the example connections described herein between a flange and a tubular member do away with the drawbacks of welding a flange to a tubular member, such as weld skips and poor welding, leading to a higher quality connection of the flange to the tubular member. They also provide for a safer method of forming such connection by eliminating the harmful fumes generated during welding, as well as the burns often endured by welders and the exposure to the harsh bright light generated during welding. They also create a more cost-effective way to connect a flange to a tubular member, as well as a more aesthetically pleasing connection.

While the description herein has been made with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A tubular member and flange combination comprising:
a tubular member comprising,
a buckled section proximate an end of the tubular member, wherein a first section of the tubular member that is not buckled comprises an outer surface opposite an inner surface, wherein the buckled section comprises an outer surface that extends radially beyond the outer surface of said tubular member first section;
a second section of the tubular member extending from the buckled section to the end of the tubular member; and
a flange comprising an opening penetrated by the second section of the tubular member, wherein said second section of said tubular member is bent radially outwards, wherein the flange is axially retained by said buckled section and said second section of the tubular member that is bent, wherein the flange comprises a first annular portion defining said flange opening, wherein the first annular portion is flared defining a frustum, wherein the bent second section of the tubular member extends over the first annular portion of the flange.

2. The combination of claim 1, wherein the flange comprises a second annular portion extending radially from the first annular portion.

3. The combination of claim 1, wherein an end of the first annular portion of the flange defines the opening of the flange, wherein said end of said first annular portion engages a surface of the buckled section of the tubular member.

4. The combination of claim 1, wherein the flange comprises a fastener opening for accommodating a fastener for connecting said combination to another structure.

5. The combination of claim 1, further comprising a flange cover penetrated by the tubular member covering a surface of the flange facing in a direction opposite the tubular member end.

6. A method for connecting a flange to a tubular member, comprising:

buckling the tubular member at a location proximate an end of the tubular member forming a buckled section such that an end section of the tubular member extends axially beyond the buckled section;
placing said flange over said tubular member end section such that the tubular member end section penetrates an opening of said flange; and
bending said end section to extend over the flange, wherein the flange is axially retained by said bent end section and said buckled section, wherein the flange comprises a first annular portion defining said flange opening, wherein the first annular portion is flared defining a frustum, and wherein placing the flange over the tubular member end section comprises placing the flange over the tubular member end section with the defined frustum having a first diameter proximate the buckled section and a second diameter greater than the first diameter distally from said buckled section closer to the tubular member end.

7. The method of claim 6, wherein the flange comprises a second annular portion extending radially from the first annular portion.

8. The method of claim 6, wherein bending said end section over the flange comprises bending said end section to extend radially over the flange first annular portion.

9. The method of claim 8, wherein bending said end section over the flange comprises bending said end section to extend radially over the flange first annular portion and parallel to the flange first annular portion.

10. The method of claim 8, wherein an end of the flange defining the flange opening rests on a surface of the buckled section.

11. The method of claim 8, wherein buckling the tubular member comprises:
supporting an outer surface of the tubular member at an axial location such that the tubular member end extends beyond said axial location; and
axially pressing on the end of the tubular member to cause said buckling of said tubular member adjacent said axial location forming a buckled section.

12. The method of claim 11, wherein bending said end section comprises:
inserting an anvil in the tubular member through said tubular end, wherein said anvil comprises a tapering outer surface; and
engaging an inner surface of said tubular member end section with said tapering outer surface as the anvil continues to be inserted into said tubular member, bending said tubular member end section.

13. The method of claim 12, wherein bending said tubular member end section further comprises pushing an end of said flange first annular portion defining the flange opening against a surface of the buckled section and pushing the buckled section in direction away from the tubular member end.

14. The method of claim 12, wherein axially pressing on the end of the tubular member comprises pressing on the end of the tubular member with a press.

15. The method of claim 14, wherein axially pressing the end of the tubular member comprises receiving said end of said tubular member into an annular opening formed on said press and a receiving projection of said press within the tubular member through said tubular member end.

16. The method of claim 15, wherein receiving said projection of said press comprises receiving said projection of said press within said tubular member and over the buckled section when said buckled section is formed.

17. The method of claim 12, wherein bending said tubular member end section comprises bending said tubular member end section to be generally parallel to said flange flared first annular portion.

18. The method of claim 11, wherein supporting said outer surface of the tubular member comprises using a support member having a main opening for accommodating the tubular member and a second opening extending axially from the main opening to the end of the support member defining an annular step therebetween, wherein said buckled section is formed over the annular step and accommodated in the second opening.

19. The method of claim 6, further comprising placing a flange cover over the tubular member, said flange cover having an opening penetrated by said tubular member.

20. A tubular member and flange combination comprising:
   a tubular member comprising,
   a buckled section proximate an end of the tubular member, wherein a first section of the tubular member that is not buckled comprises an outer surface opposite an inner surface, wherein the buckled section comprises an outer surface that extends radially beyond the outer surface of said tubular member first section;
   a second section of the tubular member extending from the buckled section to the end of the tubular member; and
      a flange comprising an opening penetrated by the second section of the tubular member, wherein said second section of said tubular member is bent radially outwards, wherein the flange is axially retained by said buckled section and said second section of the tubular member that is bent, and wherein the flange comprises a fastener opening for accommodating a fastener for connecting said combination to another structure.

21. A tubular member and flange combination comprising:
   a tubular member comprising,
   a buckled section proximate an end of the tubular member, wherein a first section of the tubular member that is not buckled comprises an outer surface opposite an inner surface, wherein the buckled section comprises an outer surface that extends radially beyond the outer surface of said tubular member first section;
   a second section of the tubular member extending from the buckled section to the end of the tubular member;
      a flange comprising an opening penetrated by the second section of the tubular member, wherein said second section of said tubular member is bent radially outwards, wherein the flange is axially retained by said buckled section and said second section of the tubular member that is bent; and
   a flange cover penetrated by the tubular member covering a surface of the flange facing in a direction opposite the tubular member end.

22. A method for connecting a flange to a tubular member, comprising:
   buckling the tubular member at a location proximate an end of the tubular member forming a buckled section such that an end section of the tubular member extends axially beyond the buckled section;
   placing said flange over said tubular member end section such that the tubular member end section penetrates an opening of said flange;
   bending said end section to extend over the flange, wherein the flange is axially retained by said bent end section and said buckled section; and
   placing a flange cover over the tubular member, said flange cover having an opening penetrated by said tubular member.

23. A method for connecting a flange to a tubular member, comprising:
   buckling the tubular member at a location proximate an end of the tubular member forming a buckled section such that an end section of the tubular member extends axially beyond the buckled section, wherein said buckling comprises,
   supporting an outer surface of the tubular member at an axial location such that the tubular member end extends beyond said axial location, and
      axially pressing on the end of the tubular member to cause said buckling of said tubular member adjacent said axial location forming a buckled section;
   placing said flange over said tubular member end section such that the tubular member end section penetrates an opening of said flange; and
   bending said end section to extend over the flange, wherein the flange is axially retained by said bent end section and said buckled section, wherein bending said end section comprises,
      inserting an anvil in the tubular member through said tubular end, wherein said anvil comprises a tapering outer surface, and
      engaging an inner surface of said tubular member end section with said tapering outer surface as the anvil continues to be inserted into said tubular member, bending said tubular member end section.

* * * * *